(12) United States Patent
Carter

(10) Patent No.: US 7,140,849 B2
(45) Date of Patent: Nov. 28, 2006

(54) VARIABLE GEOMETRY TURBINE

(75) Inventor: Jeffrey Carter, Mirfield (GB)

(73) Assignee: Holset Engineering Company, Limited, Huddersfield (GB)

( * ) Notice: Subject to any disclaimer, the term of this patent is extended or adjusted under 35 U.S.C. 154(b) by 551 days.

(21) Appl. No.: 10/719,778

(22) Filed: Nov. 21, 2003

(65) Prior Publication Data

US 2004/0247462 A1 Dec. 9, 2004

(30) Foreign Application Priority Data

Dec. 4, 2002 (GB) ................................. 0228237.4

(51) Int. Cl.
    *F04B 17/00* (2006.01)
(52) U.S. Cl. ........................................ 417/407; 60/602
(58) Field of Classification Search .................. 60/602; 415/157, 158, 160, 163, 166; 417/407
See application file for complete search history.

(56) References Cited

U.S. PATENT DOCUMENTS

| | | | |
|---|---|---|---|
| 4,242,040 A * | 12/1980 | Swearingen | ................ 415/113 |
| 4,367,626 A | 1/1983 | Schwartzman | |
| 4,622,816 A * | 11/1986 | Boudigues | .................... 60/606 |
| 4,776,168 A | 10/1988 | Woollenweber | |
| 4,779,423 A | 10/1988 | Szczupak | |
| 4,808,068 A * | 2/1989 | Asbjornson et al. | ........ 415/157 |
| 5,701,741 A | 12/1997 | Halsall | |
| 6,145,314 A | 11/2000 | Woollenweber et al. | |
| 6,256,993 B1 * | 7/2001 | Halimi et al. | ................. 60/608 |
| 6,431,823 B1 * | 8/2002 | Slepoy | ......................... 415/14 |
| 6,796,766 B1 * | 9/2004 | Hesse | ......................... 415/157 |
| 2005/0252210 A1 * | 11/2005 | Shiraishi et al. | .............. 60/602 |

FOREIGN PATENT DOCUMENTS

DE     199 24 228 A1     12/2000
GB       2 031 069 A     4/1980

* cited by examiner

*Primary Examiner*—Anthony Stashick
*Assistant Examiner*—Vikansha Dwivedi
(74) *Attorney, Agent, or Firm*—Krieg DeVault LLP; J. Bruce Schelkopf, Esq.

(57) ABSTRACT

A variable geometry turbocharger comprises a turbine wheel (20) mounted within a turbine housing (23) on one end of a turbocharger shaft (22) for rotation about a turbocharger axis. The turbine housing (23) defines an annular turbine inlet (36) around the turbine wheel (20). A compressor wheel (21) is mounted within a compressor housing (24) on the other end of the turbocharger shaft (22). Turbocharger shaft bearing assemblies (26, 27) are located within a bearing housing (25) connected between the turbine housing (23) and the compressor housing (24). A variable geometry mechanism (35) is provided for varying the size of the annular turbine inlet (36). The variable geometry mechanism is actuated by a tubular linear electric motor comprising a fixed annular stator ring (31a, 46, 48) and an axially moveable annular forcer ring (44), arranged coaxially about the turbocharger axis.

23 Claims, 2 Drawing Sheets

VARIABLE GEOMETRY TURBINE

The present application claims priority to British Patent Application No. 0228237.4 filed Dec. 4, 2002, which is incorporated herein by reference.

The present invention relates to a variable geometry turbine, and in particular the turbine of a turbocharger for an internal combustion engine.

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housing.

In known turbochargers, the turbine stage comprises a turbine chamber within which the turbine wheel is mounted, an annular inlet passageway arranged around the turbine chamber, an inlet arranged around the inlet passageway, and an outlet passageway extending from the turbine chamber. The passageways and chambers communicate such that pressurised exhaust gas admitted to the inlet chamber flows through the inlet passageway to the outlet passageway via the turbine chamber and rotates the turbine wheel.

Turbines may be of a fixed or variable geometry type. Variable geometry turbines differ from fixed geometry turbines in that the size of the inlet passageway can be varied to optimise gas flow velocities over a range of mass flow rates so that the power output of the turbine can be varied to suite varying engine demands. One common type of variable geometry turbine has vanes which extend into the inlet passageway and which can be pivoted to alter the effective cross-sectional area available for incoming gas, as well as the angle of approach of the gas to the turbine wheel. Such arrangements are generally referred to as swing vane variable geometry turbines. Typically each vane is pivotable about its own axis, and all vanes can be pivoted in unison by operation of an actuating mechanism linked to each of the vanes, often by a ring referred to as a unison ring.

In another common type of variable geometry turbine, one wall of the inlet passageway is defined by a moveable wall member, generally referred to as a nozzle ring. The position of the nozzle ring relative to a facing wall of the inlet passageway is adjustable to control the width of the inlet passageway. For instance, as gas flowing through the turbine decreases the inlet passageway width may also be decreased to maintain gas velocity and optimise turbine output. Typically the nozzle ring is provided with vanes which extend into the inlet passageway and through slots provided on the facing wall of the inlet passageway to accommodate movement of the moveable nozzle ring. Alternatively, vanes may extend from a fixed wall through slots provided in the nozzle ring. The nozzle ring is generally supported on rods extending parallel to the axis of rotation of the turbine wheel and is moved by an actuator which axially displaces the rods.

Various forms of actuator are known for use with variable geometry turbines, including pneumatic, hydraulic and electric actuators, mounted externally of the turbocharger and connected to the variable geometry system via appropriate linkages. For instance, known electric actuators comprise an electric motor mounted to the turbocharger housing and connected via a gear and mechanical linkage to movable elements of the variable geometry system. Such electric actuator systems have a number of disadvantages. For instance, the positional accuracy of the actuator is compromised by manufacturing tolerances and thermal expansion of the mechanical gear-train and linkage components. Moreover, the transient controllability (e.g. response time etc) of the actuator may be limited by backlash and hysteresis in the mechanical gear train and linkage.

It is an object of the present invention to obviate or mitigate the above disadvantages.

According to the present invention there is provided a variable geometry turbocharger comprising:

a turbine wheel mounted within a turbine housing on one end of a turbocharger shaft for rotation about a turbocharger axis, the turbine housing defining an annular turbine inlet around the turbine wheel;

a compressor wheel mounted within a compressor housing on the other end of said turbocharger shaft for rotation with the turbine wheel about said axis;

turbocharger shaft bearing assemblies located within a bearing housing connected between the turbine housing and the compressor housing;

a variable geometry mechanism for varying the size of the annular turbine inlet; and an electric motor for actuating the variable geometry mechanism;

wherein the electric motor is a tubular linear electric motor comprising a fixed annular stator ring and an axially moveable annular forcer ring, arranged coaxially about said turbocharger axis with movement of the forcer ring effecting adjustment of the variable geometry mechanism.

The annular linear motor is a particularly compact arrangement which can readily be incorporated in the turbocharger. In particular, in preferred embodiments of the invention the motor is located within the bearing housing, for instance between inner and outer bearing housing walls. In such embodiments of the invention the actuator motor is protected from accidental damage or tampering. In addition, avoiding mounting actuator components externally to the turbine housing increases flexibility of installation of the turbocharger in an engine environment. This particular assembly is also robust in construction and relatively simple to manufacture and assemble. Cooling is also readily provided by the turbochargers normal water and oil supply systems. In addition, location of the actuator motor relatively close to the variable geometry mechanism improves positional accuracy in control of the variable geometry mechanism, with produced dimensional tolerances in linkages between the two. This in turn improves transient controllability through reduced backlash and hysteresis in the linkage.

Various forms of the new electric motor may be used, including reluctance motors and motor arrangements conventionally employed in linear stepper and servo motors (such as brushless AC arrangements).

Other preferred and advantageous features of the invention will be apparent from the following description of embodiments of the invention.

Specific embodiments of the present invention will now be described, by way of example only, with reference to the accompanying drawings, in which.

Figure 1:
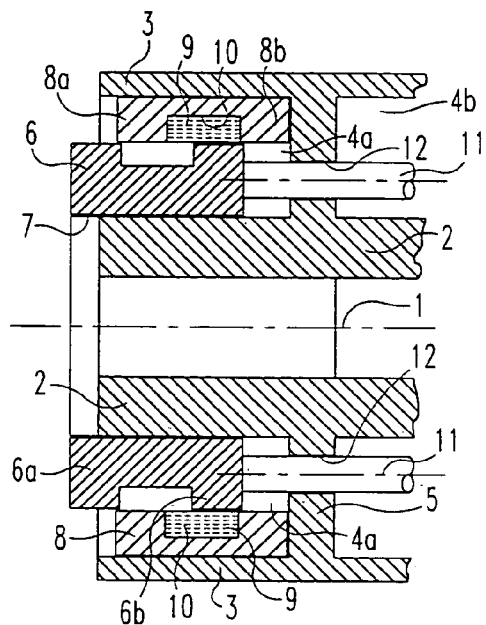
FIG. 1 is a schematic illustration of a turbocharger bearing housing and variable geometry actuating system in accordance with a first embodiment of the present invention.

Referring to FIG. 1, this schematically illustrates a radial section through part of a turbocharger bearing housing incorporating an electric actuator for a variable geometry turbine in accordance with the present invention. The axis of the turbocharger is indicated by dotted line 1. In a completed turbocharger a turbocharger shaft will extend through the bearing housing along the axis 1, the turbine being located to the right of FIG. 1 and the compressor being located to the left.

The bearing housing comprises a cylindrical inner housing wall 2 and cylindrical outer housing wall 3 defining an annular cavity therebetween. The annular cavity is separated into axial portions 4a and 4b by a housing wall 5 which extends radially between the inner and outer housing walls 2 and 3. The cavity portion 4b houses a variable geometry turbine nozzle arrangement (not shown) which is moveable to vary the geometry of a turbine inlet (not shown). Annular cavity portion 4a houses an electric actuator for the variable geometry system in accordance with the present invention.

The actuator is essentially a tubular linear electric motor in which the forcer (moving member) comprises an inner forcer ring 6 of iron (or other appropriate ferromagnetic material) slidably mounted on a cylindrical linear bearing 7. As shown in FIG. 1, in radial cross-section the forcer ring 6 is generally C shaped with radially outwardly extending annular portions 6a and 6b. The motor stator comprises an outer ring 8 (again fabricated from iron or other suitable ferromagnetic material) and is secured to the inner surface of outer bearing housing wall 3, adjacent the radial housing wall 5. Stator ring 8 is also generally C shaped in radial cross-section, but in this case the radial extending portions 8a and 8b extend radially inwards. An annular electric coil 9 (of appropriate wound conductor) is located within annular channel 10 defined between radially extending portions 8a and 8b of stator ring 8. The coil 9 may be encapsulated within an epoxy compound to improve mechanical stiffness and thermal conductivity.

Axially oriented push rods 11 (at least two) extend from the forcer ring 6 at circumferentially spaced positions and extend through respective apertures 12 in the annular housing wall 5 and into cavity portion 4b where they act upon the moveable nozzle member (not shown).

Supply of an electric current to the coil 10 generates magnetic flux which passes through both the forcer and stator rings 6 and 8. The action of the magnetic flux exerts a force tending to align radially extending portions 6a and 6b of forcer ring 6 with radially extending portions 8a and 8b respectively of stator ring 8. This is a result of the well known reluctance effect (the forcer ring is magnetised by the magnetic field generated by the coil and is often referred to as a reluctance magnet). Since the stator ring 8 is fixed in position, the force generated acts to move the inner forcer ring 6 axially along the bearing housing. The magnitude of the motive force can be controlled by controlling the magnitude of the current flowing through the coil (by appropriate control of the mean voltage level applied to the coil). This enables precise control over the axial positioning of the inner forcer ring 6, and hence of the geometry of the turbine via the push rods 11 which act on the variable geometry mechanism (e.g. moving nozzle ring).

Figure 2:
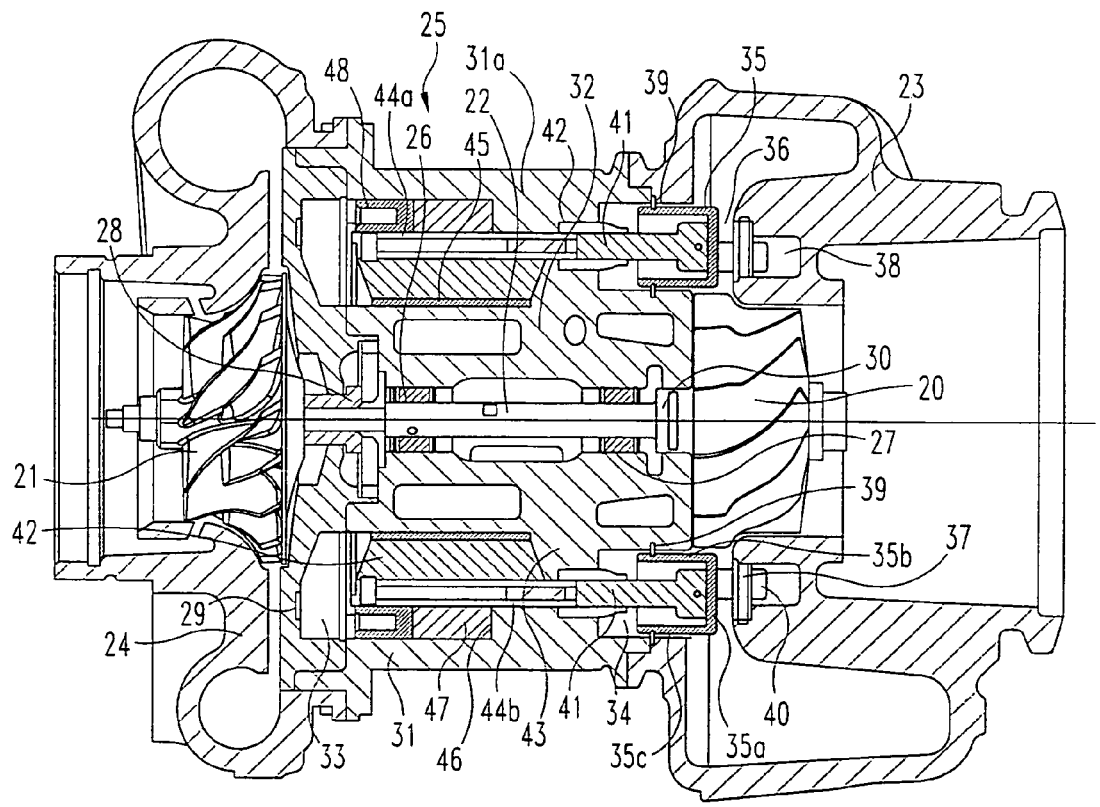
FIG. 2 is an axial cross-section through a turbocharger including a modification of the variable geometry actuating system of FIG. 1.

FIG. 2 illustrates a cross-section through a turbocharger having a variable geometry turbine and incorporating a modification of the actuator of FIG. 1. The illustrated turbocharger comprises a turbine wheel 20 and a compressor wheel 21 mounted to opposite ends of a turbocharger shaft 22. The turbine wheel 20 rotates within a turbine housing 23 and the compressor wheel 21 rotates within a compressor housing 24. Between the turbine wheel 20 and compressor wheel 21 the shaft 22 passes through a bearing housing 25 which interconnects the turbine and compressor housings 23 and 24. As is conventional, the bearing housing has a central portion which houses journal bearing assemblies 26 and 27 located towards the compressor and turbine ends of the bearing housing respectively. The compressor end of the bearing housing 25 itself houses a thrust bearing/oil seal assembly 28 and terminates in a radially extending diffuser section 29 which forms part of the compressor housing. Similarly, an oil seal arrangement 30 is provided at the turbine end of the turbocharger shaft 22 where it passes into the turbine housing 23. Details of the bearing and oil seal arrangements may be entirely conventional and will not be described further.

The bearing housing 25 has an outer generally cylindrical wall 31 and an inner generally cylindrical portion 32 defining an annular actuator cavity 33 and nozzle ring cavity 34 therebetween (corresponding to the cavity portions 4a and 4b of FIG. 1). An axially moveable nozzle ring 35 is located within the cavity 34 and provides an annular wall 35a which defines one side of an annular turbine inlet passage 36. The opposing side of the inlet passage 36 is defined by a shroud plate 37 which covers an annular cavity 38 provided in the turbine housing 23. The nozzle ring 35 has inner and outer axially extending annular portions 35b and 35c which are sealed with respect to the bearing housing by inner and outer seal rings 39. The nozzle ring 35 supports a circumferential array of vanes 40 which extend across the turbine inlet 36 and through slots (not shown) provided in the shroud plate 37. The nozzle ring 35 is supported on a pair of push rods 41 which extend through tubular bearings 42, provided in a bearing housing radial wall 43 which separates the actuator cavity 33 from the nozzle ring cavity 34.

The above described nozzle ring arrangement is essentially conventional and incorporated in existing variable geometry turbine designs. Where the present invention differs from the prior art is in the provision of an electric actuator located within the cavity 33, and moreover a linear actuator acting directly on the push rods 41 which support the nozzle ring 35.

In accordance with the present invention the actuator is a tubular linear electric reluctance motor comprising inner forcer ring 44 which is slidably mounted on an annular linear bearing 45 for axial movement within the cavity 33. The push rods 41 are secured to the ring 44 by way of respective fixing bolts 41a which extend through radially outwardly projecting annular portions 44a and 44b provided at opposing axial ends of ring 44. Forcer ring 44 corresponds to inner ring 6 of FIG. 1.

Outer bearing housing wall 31 has a radially thickened portion 31a adjacent radial wall 43 which defines an inner radial shoulder 46 within actuator cavity 33. An annular electrical coil member 47 is disposed within the outer bearing housing wall 31 adjacent the annular housing shoulder 46 and is secured axially by a ring 48. Together, the radially thickened portion 31a of the bearing housing wall defining the annular shoulder 46, the ring 48, and that portion of the outer bearing housing wall 31 extending therebetween, correspond to the outer ring 8 of FIG. 1, and together with electric coil 47 form the stator of the actuator.

Movement and positional control of the nozzle ring 35 is achieved by providing a controlled voltage to the electrical coil 47 to generate a current therein which produces a magnetic flux which flows through the outer bearing housing wall 31, 31*a* and ring 48, and through the inner forcer ring 44, thereby exerting an axial force on the forcer ring 44, which in turn acts on the nozzle ring 35 via the push rods 41.

It will be appreciated that the detail of the variable geometry mechanism, including the nozzle ring and its manner of mounting and movement, may vary from that shown. Moreover, it will be appreciated that the actuator could be applied to other forms of variable geometry mechanism.

It will also be appreciated that details of the particular configuration of the components of the electric actuator may vary from those shown. For instance, rather than providing the outer bearing housing wall with an enlarged radial portion defining an annular shoulder to form part of the motor stator, an appropriate stator ring (configured similar to that shown in FIG. 1) could be fixed in position within the bearing housing wall of the turbocharger of FIG. 2.

Similarly, the configuration, and location, of the push rods 41, or similar links to the nozzle ring, may vary.

It will also be appreciated that whereas with above described embodiments of the invention the stator is the radially outer component of the linear motor, this arrangement could be reversed by providing a movable radially outer forcer ring and a fixed radially inner stator. Operation will otherwise be the same as that described above.

Figure 3:
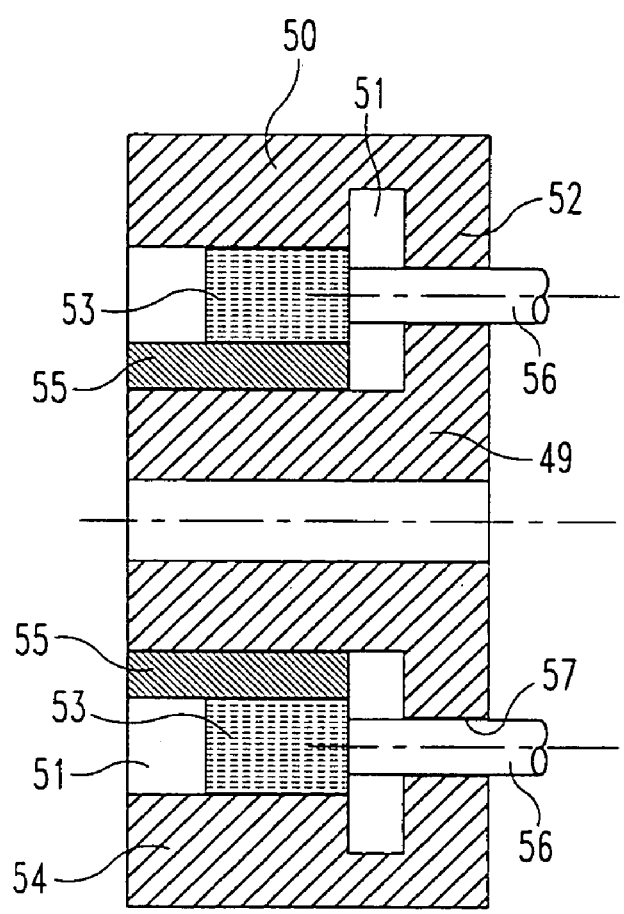
FIG. 3 is a schematic illustration of a turbocharger bearing housing and variable geometry turbine actuating system in accordance with a second embodiment of the present invention.

The above described embodiments of the invention take advantage of the reluctance effect to generate the necessary motor force. Alternative embodiments of the invention may however generate motor force through the Lorentz effect. FIG. 3 is a schematic illustration of such an embodiment.

Referring to FIG. 3, this is an axial cross section through part of a turbocharger bearing housing corresponding to that part of the bearing housing shown schematically in FIG. 1. Thus, the bearing housing comprises a cylindrical inner wall 49 and cylindrical outer wall 50 defining an annular actuator cavity 51 therebetween. In this embodiment, radial housing wall 51 which defines one end of the cavity 51 is an end wall of the bearing housing rather than an intermediate wall. In this instance the variable geometry components (not shown) will be located within the turbine housing to the right of wall 52 as shown in FIG. 3 (a similar modification can be applied to the embodiment illustrated schematically in FIG. 1). Whether or not the variable geometry components are located in the bearing housing or turbine housing is largely irrelevant to operation of the present invention.

An annular electric coil carrying forcer 53 is slidably mounted within the cavity 49 between a radially thickened portion 54 of the bearing housing outer wall 50, and an inner annular magnet 55 which is mounted around the inner bearing housing wall 49. The magnet 55 is a permanent magnet producing a radial magnetic flux which forms a magnetic circuit through the inner, outer and annular housing wall portions 50,52,54 (which are thus preferably fabricated from iron or other material with higher magnetic permeability). Axially extending push rods 56 extend from the forcer 53 through respective apertures 57 through the bearing housing end wall 52 to act on the variable geometry mechanism (not shown).

The magnetic coil of forcer 53 is wound so that the conductors are largely perpendicular to the magnetic flux in the cavity. As a result, application of an AC voltage to the coil, thus causing a varying current to flow through the coil, generates an electromagnetic force (through the Lorentz effect) which moves the forcer 53 axially within the cavity (essentially a brushless AC motor). Movement of the coil effects movement of the variable geometry mechanism via the push rods 57. The force applied to the coil, and thus the movement and position of the forcer 53, can be accurately controlled by appropriate control of the voltage and hence current applied to the coil.

Although the nature of the force generation, and the detailed design of the actuator, of this embodiment of the invention differs from that of the embodiments of FIGS. 1 and 2, all embodiments share the common feature of a linear electric motor located within the bearing housing.

The invention claimed is:

1. A variable geometry turbocharger comprising:
    a turbine wheel mounted within a turbine housing on one end of a turbocharger shaft for rotation about a turbocharger axis, the turbine housing defining an annular turbine inlet around the turbine wheel;
    a compressor wheel mounted within a compressor housing on the other end of said turbocharger shaft for rotation with the turbine wheel about said axis;
    turbocharger shaft bearing assemblies located within a bearing housing connected between the turbine housing and the compressor housing;
    a variable geometry mechanism for varying the size of the annular turbine inlet; and
    an electric motor for actuating the variable geometry mechanism;
    wherein the electric motor is a tubular linear electric motor comprising a fixed annular stator ring and an axially moveable annular forcer ring, arranged coaxially about said turbocharger axis with movement of the forcer ring effecting adjustment of the variable geometry mechanism.

2. A turbocharger according to claim 1, wherein the electric motor is located within the bearing housing.

3. A turbocharger according to claim 2, wherein the bearing housing comprises an inner annular wall surrounding said turbocharger shaft and said bearing assemblies, and an outer annular wall surrounding said inner annular wall, wherein the electric motor is located within an annular space defined between the inner and outer annular bearing housing walls.

4. A turbocharger according to claim 1, wherein the stator ring comprises a conductive coil energisation of which generates a magnetic field which interacts with the forcer ring thereby exerting an axial force on the forcer ring.

5. A turbocharger according to claim 4, wherein the electric motor is a reluctance motor, said forcer ring comprising a reluctance magnet.

6. A turbocharger according to claim 5, wherein the electric motor is a brushless AC motor, the stator ring comprising a permanent magnet such that the force is produced by the Lorentz effect.

7. A turbocharger according to claim 5, wherein the stator ring and forcer ring each comprises one or more radially extending portions, the radially extending portions of the stator ring extending in a radial direction towards the radially extending portions of the forcer ring and vice versa, the reluctance force generated by energisation of said coil tending to bring radially extending portions of the stator ring and forcer ring into alignment with one another.

8. A turbocharger according to claim 7, wherein said radially extending portions are annular.

9. A turbocharger according to claim 1, wherein the forcer ring comprises a conductive coil energisation of which generates a magnetic field which interacts with the stator ring thereby exerting an axial force on the forcer ring.

10. A turbocharger according to claim 9, wherein the electric motor is a brushless AC motor wherein the forcer ring is a permanent magnet, said force being produced by the Lorentz effect.

11. A turbocharger according to claim 9, wherein the electric motor is a reluctance motor, said stator ring comprising a reluctance magnet.

12. A turbocharger according to claim 11, wherein the coil is located between radially extending portions of the stator ring or forcer ring.

13. A turbocharger according to claim 11, wherein the stator ring and forcer ring are each generally "c" shaped in axially cross-section, each having two radially extending annular portions.

14. A turbocharger according to claim 11, wherein the stator ring and forcer ring each comprises one or more radially extending portions, the radially extending portions of the stator ring extending in a radial direction towards the radially extending portions of the forcer ring and vice versa, the reluctance force generated by energisation of said coil tending to bring radially extending portions of the stator ring and forcer ring into alignment with one another.

15. A turbocharger according to claim 14, wherein said radially extending portions are annular.

16. A turbocharger according to claim 1, wherein the stator ring surrounds the forcer ring.

17. A turbocharger according to claim 1, wherein the forcer ring surrounds the stator ring.

18. A turbocharger according to claim 1, wherein the stator ring is defined at least in part by a portion of the housing.

19. A turbocharger according to claim 1, wherein the forcer ring slides on a linear bearing which lines the inner surface of the outer bearing housing wall or the outer surface of the inner bearing housing wall.

20. A turbocharger according to claim 1, wherein a plurality of push rods extend from the forcer ring to the variable geometry mechanism.

21. A turbocharger according to claim 20, wherein said push rods extend through respective bores in an annular housing wall separating said annular space in which the electric motor is located from the variable geometry mechanism.

22. A turbocharger according to claim 1, wherein the variable geometry mechanism comprises an axially movable annular member, an annular portion of which defines one wall of said annular turbine inlet.

23. A turbocharger according to claim 1, wherein the bearing housing is fabricated from a ferromagnetic metal such as iron or an iron based alloy.

* * * * *